(12) United States Patent
Mengane et al.

(10) Patent No.: US 8,155,923 B2
(45) Date of Patent: Apr. 10, 2012

(54) SYSTEM, REMOTE DEVICE, AND METHOD FOR VALIDATING OPERATION OF A WIND TURBINE

(75) Inventors: Amit Vasant Mengane, Andhra Pradesh (IN); Sreedhar Desabhatla, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 11 days.

(21) Appl. No.: 12/480,477

(22) Filed: Jun. 8, 2009

(65) Prior Publication Data
US 2010/0138188 A1   Jun. 3, 2010

(51) Int. Cl.
*G05D 17/00* (2006.01)
(52) U.S. Cl. .................. 702/182; 702/188; 700/287
(58) Field of Classification Search .......... 702/182–185, 702/188; 700/285–287
See application file for complete search history.

(56) References Cited

U.S. PATENT DOCUMENTS

| | | | |
|---|---|---|---|
| 6,628,992 B2 | 9/2003 | Osburn, III | |
| 6,785,592 B1 | 8/2004 | Smith et al. | |
| 7,280,883 B2 * | 10/2007 | Kitamoto et al. | 700/121 |
| 7,672,262 B2 | 3/2010 | McCoy et al. | |
| 2002/0029097 A1 * | 3/2002 | Pionzio et al. | 700/286 |
| 2004/0093317 A1 * | 5/2004 | Swan | 707/1 |
| 2005/0090937 A1 * | 4/2005 | Moore et al. | 700/286 |
| 2006/0149434 A1 * | 7/2006 | Bertosa et al. | 701/29 |
| 2009/0037494 A1 * | 2/2009 | Wong et al. | 707/202 |
| 2009/0281675 A1 * | 11/2009 | Rasmussen et al. | 700/287 |
| 2009/0299697 A1 | 12/2009 | Hamby et al. | |

\* cited by examiner

*Primary Examiner* — Manuel L Barbee
(74) *Attorney, Agent, or Firm* — James McGinness, Esq.; Armstrong Teasdale LLP

(57) ABSTRACT

A method for validating operation of a wind turbine from a remote device. The remote device communicates with a controller, which is operatively coupled to the wind turbine. The method includes enabling a user through the remote device to submit a request for wind turbine operating data, composing a command corresponding to the request, transmitting the command to the controller, and receiving by the remote device a response from the controller. The response includes wind turbine operating data corresponding to the command.

17 Claims, 3 Drawing Sheets

SYSTEM, REMOTE DEVICE, AND METHOD FOR VALIDATING OPERATION OF A WIND TURBINE

BACKGROUND OF THE INVENTION

The field of the invention relates generally to validation of wind turbine operation and, more particularly, to acquiring data captured by a control system of a wind turbine.

Wind turbines utilize wind energy to generate or produce electrical power. Wind turbines typically include a controller, which is responsible for monitoring and adjusting various aspects of wind turbine operation.

Like any mechanical device, a wind turbine may eventually malfunction. When this occurs, the operator generally wishes to return the wind turbine to a normal state as soon as possible. However, quickly correcting a malfunction can pose a challenge to the operator because diagnosis often requires access to data collected and managed by the wind turbine controller. Some controllers provide for remote access to this data via an interactive command interface. The remote operator must enter very specific commands to retrieve data and then save the retrieved data such that the retrieved data can be transmitted to a support specialist for evaluation. Further, command syntax may vary based on the software or a version of the software installed on the controller. This manual process may introduce delay and a risk of operator error, especially when performed by an operator with little technical expertise.

BRIEF DESCRIPTION OF THE INVENTION

In one aspect, a system is provided for validating operation of a wind turbine. The system includes a controller and a remote device. The controller is operatively coupled to the wind turbine and includes a first communication interface. The remote device includes a user input device configured to enable a user to submit a request for wind turbine operating data. The operating data includes at least one of a recorded sensor signal, a recorded fault condition, and a recorded controller state. The remote device also includes a first processor that is operatively coupled to the user input device and programmed to compose a command corresponding to the submitted request. The remote device also includes a second communication interface that is operatively coupled to the first processor and communicatively coupled to the first communication interface. The second communication interface is configured to transmit the composed command to the first communication interface and receive a response from the first communication interface. The response includes wind turbine operating data corresponding to the transmitted command.

In another aspect, a remote device is provided. The remote device is configured to communicate with a controller that is operatively coupled to a wind turbine. The remote device includes a communication interface, a user input device, and a processor. The communication interface is communicatively couplable to the controller. The user input device is configured to allow a user to submit a request for wind turbine operating data from the controller. The operating data includes at least one of a recorded sensor signal, a recorded fault condition, and a recorded controller state. The processor is operatively coupled to the communication interface and the user input device and is configured to recognize the request submitted through the user input device, compose a command corresponding to the recognized request, transmit the composed command to the controller using the communication interface, and receive a response from the controller. This response includes wind turbine operating data corresponding to the transmitted command.

In another aspect, a method is provided for validating operation of a wind turbine from a remote device. The remote device is in communication with a controller, which is operatively coupled to the wind turbine. The method includes enabling a user through the remote device to submit to the controller a request for wind turbine operating data. The requested operating data includes a recorded sensor signal, a recorded fault condition, and/or a recorded controller state. The method also includes composing a command corresponding to the submitted request, transmitting the composed command to the controller, and receiving by the remote device a response from the controller. The response includes wind turbine operating data corresponding to the transmitted command.

DETAILED DESCRIPTION OF THE INVENTION

The embodiments described herein provide a user with access to operating data from a wind turbine controller with minimal technical expertise required of the user. The user interacts with a remote device, which provides a user interface to the user. Manipulating the user interface, the user submits a request for operating data. The remote device composes commands corresponding to the submitted request and transmits the commands to the controller. The controller returns operating data corresponding to the submitted request. By composing commands for the user rather than requiring the user to adhere to strict command syntax, the embodiments described herein reduce delay and the risk of operator error in acquiring operating data from the wind turbine controller.

As used herein, the term wind turbine is intended to be representative of any device that generates rotational energy from wind energy and, more specifically, converts kinetic energy of wind into mechanical energy.

Figure 1:
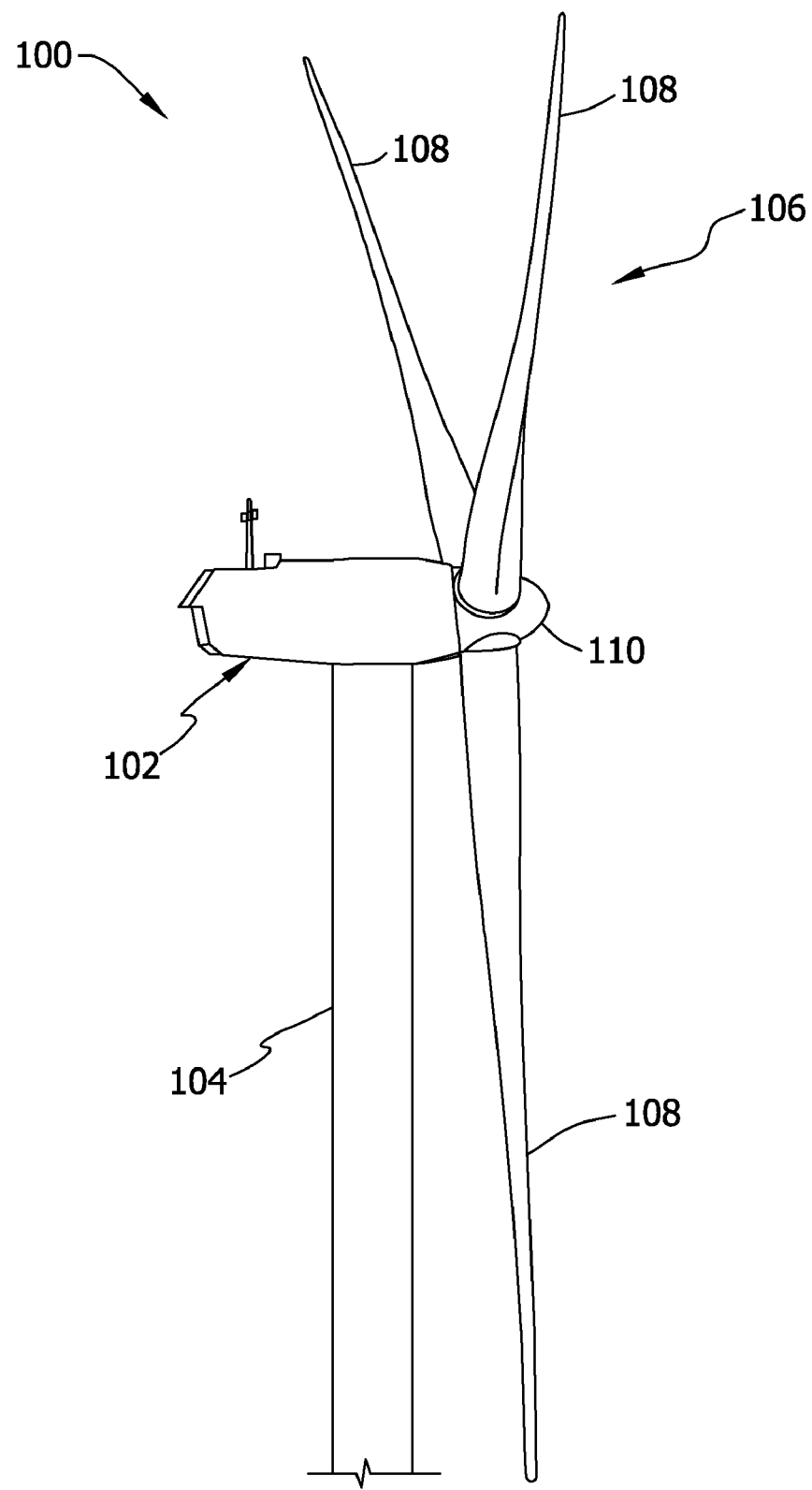
FIG. 1 is a schematic view of an exemplary wind turbine.

FIG. 1 is a schematic view of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may be any height that facilitates operation of wind turbine 100 as described herein. Wind turbine 100 also includes a rotor 106 that includes three rotor blades 108 attached to a rotating hub 110. Alternatively, wind turbine 100 includes any number of rotor blades 108 that facilitate operation of wind turbine 100 as described herein. In the exemplary embodiment, wind turbine 100 includes a gearbox (not shown in FIG. 1) rotatingly coupled to rotor 106 and/or the generator.

Figure 2:
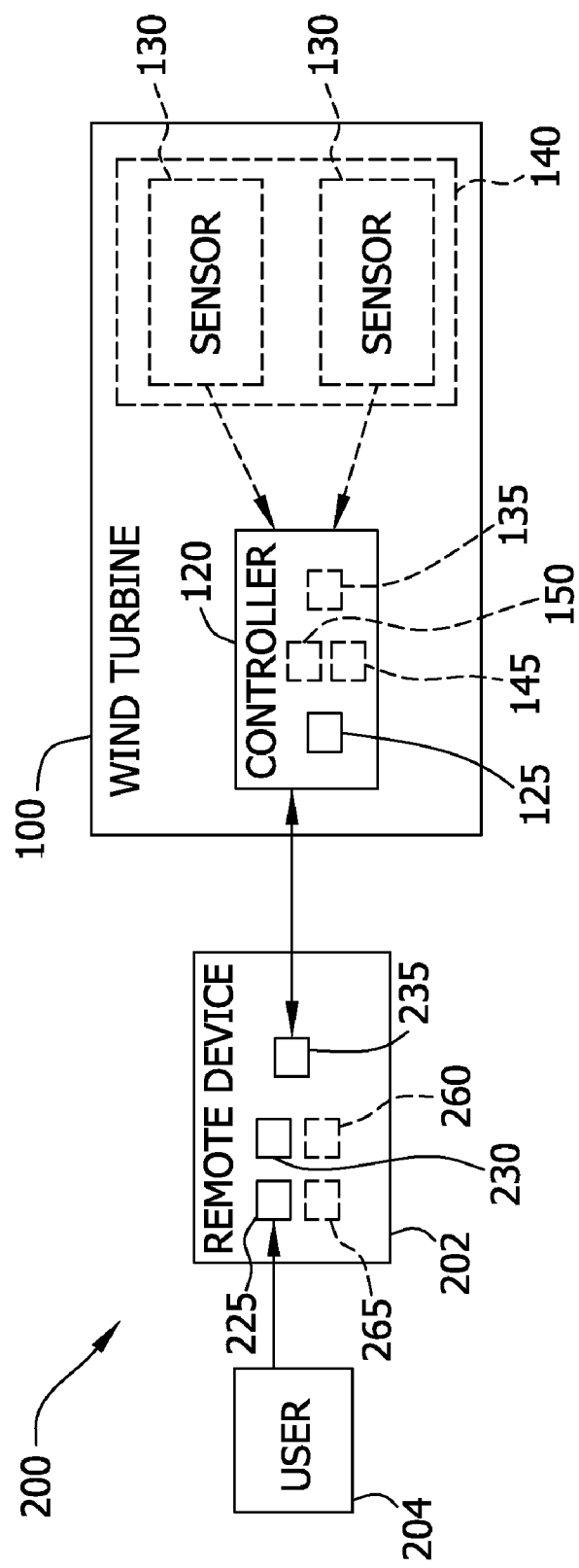
FIG. 2 is a block diagram illustrating an exemplary system for validating operation of a wind turbine such as that shown in FIG. 1 using a remote device.

Wind turbine 100 includes a controller 120 (shown in FIG. 2). Controller 120 is operatively coupled to wind turbine 100 and includes a first communication interface 125. In one embodiment, controller 120 is positioned within wind turbine 100. For example, controller 120 may be positioned within nacelle 102 or within tower 104.

In certain embodiments, wind turbine 100 includes or is coupled to one or more sensors 130 configured to sense or detect desired wind turbine operating conditions and/or parameters. Sensor 130 is further configured to generate and transmit a corresponding signal to a sensor interface 135 of controller 120. Sensor 130 may include an ambient air temperature sensor, a wind speed sensor, a wind direction sensor, an air density sensor, an atmospheric pressure sensor, a humidity sensor, a blade pitch sensor, a gear ratio sensor, a turbine speed sensor, a turbine temperature sensor, a voltage sensor, a current sensor, and/or any sensor suitable for use with wind turbine 100. Sensor 130 is positioned according to its function. For example, a wind speed sensor may be positioned on an outside surface of nacelle 102 or tower 104, such that the wind speed sensor is exposed to air surrounding wind turbine 100. As another example, one or more blade pitch sensors may be positioned on or inside nacelle 102, on or inside rotor blade 108, and/or on or inside hub 110, such that the blade pitch sensors detect the pitch of rotor blade 108 relative to hub 110. Sensor 130 may provide a signal continuously, periodically, or only once, for example, though other signal timings are also contemplated.

If wind turbine 100 includes multiple sensors 130, controller 120 may include multiple sensor interfaces 135, each communicatively coupled to a subset of sensors 130. Alternatively, controller 120 may include one sensor interface 135, communicatively coupled to multiple sensors 130.

In certain embodiments, wind turbine 100 includes a frequency converter 140 having one or more associated sensors 130. Sensors 130 may include a speed encoder, a temperature sensor, a voltage sensor, a current sensor, a status indicator (e.g., a mechanical switch), or any other sensor suitable for placement within, on, or near frequency converter 140.

In one embodiment, controller 120 includes a memory 145 and a processor 150. In one embodiment, controller processor 150 is programmed to receive the signal transmitted by sensor 130 through sensor interface 135, detect a fault condition based on the received signal, and/or detect a controller state. The received signal, the detected fault condition, and/or the detected controller state may be stored in memory 145.

Controller 120 may be configured (e.g., by programming controller processor 150) to receive and record multiple signals from sensors 130. In responding to a request for a recorded signal, controller processor 150 may provide all signals in memory 145 or only signals meeting a criterion or criteria. A criterion may be defined in controller 120 or may be provided as a parameter of a command. A criterion may impose an age threshold on signals to be provided. For example, a criterion may dictate that controller processor 150 should provide only the 50 most recently received or recorded signals or only signals received or recorded in the last 24 hours. A criterion may also specify that only signals from a particular sensor or a particular type of sensor should be provided. Other types of criteria are also contemplated. A criterion may be negated with a logical inversion operator (e.g., sensor signals not corresponding to a temperature sensor). A criterion may also be combined with another criterion using a conjunctive (i.e., "and") or disjunctive (i.e., "or") logical operator. For example, a command may specify signals that correspond to a temperature sensor and are less than 30 days old.

Controller processor 150 may be programmed to detect a fault condition based on a signal from one or more sensors 130. For example, controller 120 may include in memory 145 a configuration parameter defining a maximum safe speed for rotor 106. If controller processor 150 receives a signal from a turbine speed sensor indicating a speed in excess of the defined maximum safe speed, controller processor 150 may detect and record a fault condition. The fault condition is stored in memory 145 along with information including, without limitation, a date and/or a time of detection, a defined maximum safe speed, and/or an indicated speed. A fault condition may include a type or a description, such as "Rotor overspeed" in the example provided, and/or a severity level. In certain embodiments, controller processor 150 records a controller state when controller 120 detects a fault condition. The fault condition may be associated with the recorded controller state. In responding to a request for a recorded fault condition, controller processor 150 may provide at least a portion of the information related to the fault condition.

In certain embodiments, controller processor 150 is programmed to detect and record multiple fault conditions. In responding to a request for a fault condition, controller processor 150 may provide all fault conditions in memory 145 or only fault conditions meeting a criterion or criteria. As with criteria related to sensor signals, a criterion may be defined in controller 120 or be provided as a parameter of a command. A criterion may impose an age threshold on fault conditions or may specify that only fault conditions of a particular type (e.g., rotor overspeed) should be provided. Other types of criteria are also contemplated. A criterion may be negated or combined with another criterion.

Controller processor 150 may record a state of controller 120 periodically, in response to an event such as a detection of a fault condition, or in response to a command. A recorded controller state may include a partial or complete capture or snapshot of the controller software at a point in time. Such a snapshot may include, without limitation, controller configuration parameters, at least a portion of memory 145, a state of one or more processes running on controller processor 150, and/or a value of one or more variables in controller processor 150 (e.g., a value of a register of controller processor 150). Controller configuration parameters may include wind turbine operating parameters (e.g., a maximum rotor speed and/or a maximum voltage) or controller software parameters (e.g., a software version or a communication protocol version). Other configuration parameters related to operation of wind turbine 100 and/or controller 120 are also contemplated. In certain embodiments, the snapshot includes a core dump of a process. In other embodiments, the controller software executes in a virtual machine, and the recorded controller state includes a virtual machine state or snapshot.

Controller 120 may be configured (e.g., by programming controller processor 150) to receive transmitted commands through first communication interface 125 and respond to received commands through first communication interface 125.

FIG. 2 is a block diagram illustrating an exemplary system 200 for validating operation of wind turbine 100 using a remote device 202. System 200 is designed for use by a user 204, who interacts with remote device 202 to access information from controller 120.

Remote device 202 includes any suitable device capable of communicating with or accessing controller 120 and interacting with user 204. By way of example only, and not limitation, remote device 202 may include a laptop computer, a desktop computer, a set-top box, an electronic book reader, a digital music player, a cellular phone, and/or a smart phone.

Remote device 202 includes a user input device 225 configured to enable user 204 to submit a request for wind turbine operating data, which may include at least one of a recorded sensor signal, a recorded fault condition, and a recorded controller state. User input device 225 allows user 204 to generate input to remote device 202 and may include, for example, a keyboard, a pointing device, a touch sensitive screen, and/or an audio input device. Remote device 202 may also include an output device 265. Remote device 202 also includes a processor 230 that is operatively coupled to user input device 225 and programmed to compose a command corresponding to the submitted request. Remote device 202 also includes a second communication interface 235 that is operatively coupled to remote device processor 230 and communicatively couplable to first communication interface 125 of controller 120. Second communication interface 235 is configured to transmit one or more composed commands to first communication interface 125 and receive one or more responses from first communication interface 125. In one embodiment, the response includes wind turbine operating data corresponding to the transmitted command.

In one embodiment, remote device 202 includes a recordable storage medium 260. Recordable storage medium 260 may include, for example, a magnetic disk, a solid state disk, flash memory, a magnetic tape, a magneto-optical disc, and/or an optical disc. Recordable storage medium 260 may also include a combination or an array of storage media, such as multiple hard disks in a redundant array of independent disks (RAID) configuration. Remote device processor 230 may be programmed to store the operating data on recordable storage medium 260 in a plain text format, a structured text format such as XML, or a binary data format, though any suitable format is also contemplated. In certain embodiments, remote device processor 230 may use output device 265 to prompt user 204 to select a wind turbine operating data destination corresponding to a physical location and/or a logical location within recordable storage medium 260. Remote device processor 230 stores the wind turbine operating data in the selected destination.

A request from user 204 may require remote device 202 to transmit multiple commands to controller 120. For example, user 204 may request a recorded fault condition and a recorded controller state. In certain embodiments, therefore, remote device processor 230 is further programmed to compose an additional command corresponding to the submitted request, transmit the additional composed command to controller 120 using second communication interface 235, and receive an additional response from controller 120 using second communication interface 235. The additional response includes additional wind turbine operating data corresponding to the transmitted additional command.

Remote device 202 may communicate with controller 120 via a wired or wireless connection. For example, the communication may occur over a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, or a wired network connection such as Ethernet or an optical fiber. In an alternative embodiment, remote device 202 communicates with controller 120 wirelessly using radio frequency (RF), BLUETOOTH, an IEEE 802.11 standard, such as 802.11(g) or 802.11(n), Worldwide Interoperability for Microwave Access (WIMAX), a cellular phone technology, such as the Global Standard for Mobile communication (GSM), or any other suitable wireless communication means.

Where present, output device 265 may include a graphical display device, an audio output device, or any device capable of conveying information to user 204. Prior to transmitting a command to controller 120, remote device processor 230 may, through output device 265, prompt user 204 to enter at least one connection parameter, such as a port identifier (e.g., a port name or port number), a device identifier, a unique name, an address, a phone number, a communication protocol, and/or any other connection parameter required for connecting to and/or communicating with controller 120. Remote device processor 230 may use the entered connection parameter to transmit the command to controller 120.

Remote device processor 230 may be programmed to include one or more criteria as a parameter or parameters of a command. For example, remote device processor 230 may be programmed to include with a command a static criterion or criteria. Alternatively, remote device processor 230 may be programmed to, through output device 265, prompt user 204 to enter a criterion or criteria. Remote device processor 230 may be further programmed to recognize, through user input device 225, a criterion or criteria provided by user 204 and include the criterion or criteria with a command.

The appropriate form for a command may depend on a version of software installed on controller 120. In certain embodiments, therefore, remote device processor 230 is configured to detect a version of software installed on controller 120. Controller 120 may explicitly identify the installed software version to remote device 202, or remote device 202 may infer the installed software version based on the manner in which controller 120 responds to a command. Remote device processor 230 composes a command based on the detected version of software.

In one embodiment, controller 120 supports one or more communication protocols. Remote device processor 230 may detect the protocols supported by controller 120, either by explicit identification or inference, as described above, and compose a command based on the detected supported protocols.

In one embodiment, remote device processor 230 is programmed to use output device 265 to prompt user 204 to select a software version or protocol. Remote device processor 230 recognizes the response of user 204 through user input device 225 and composes a command based on the selected software version or protocol. This approach may be used, for example, where detection of a software version or protocol is not possible or where user 204 elects to override a detected software version or protocol, though other appropriate scenarios are also contemplated.

Figure 3:
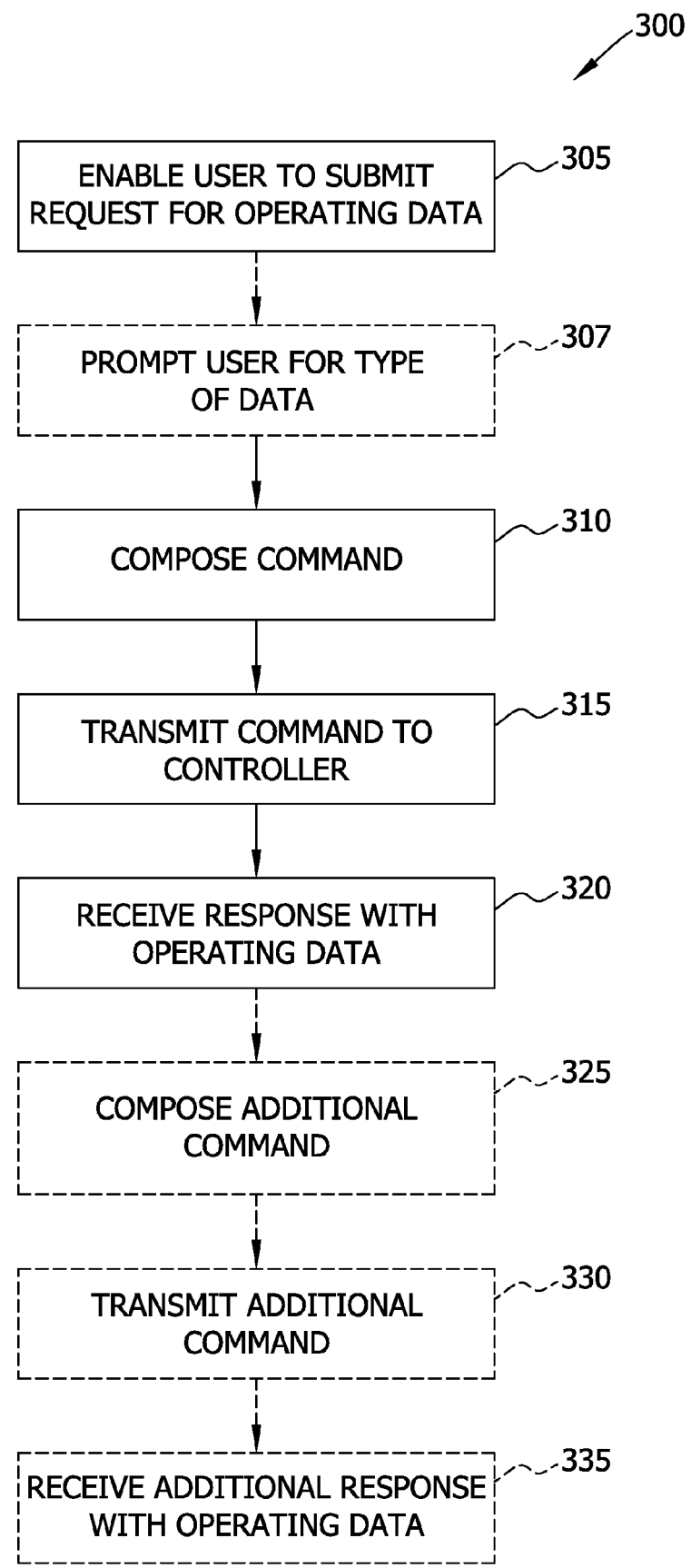
FIG. 3 is a flowchart of an exemplary method for validating operation of a wind turbine such as that shown in FIG. 1.

FIG. 3 is a flowchart of an exemplary method 300 for validating operation of a wind turbine, such as wind turbine 100, from a remote device. The remote device is in communication with a controller, which is operatively coupled to the wind turbine. The method includes enabling 305 a user to submit to the controller a request for wind turbine operating data. The requested wind turbine operating data may include a recorded sensor signal, a recorded fault condition, and/or a recorded controller state. In certain embodiments, the method includes presenting a collection of available types of wind turbine operating data and prompting 307 the user to select one or more types from the presented collection. The method also includes composing 310 a command corresponding to the submitted request, transmitting 315 the composed command to the controller, and receiving 320 by the remote device a response from the controller. The response includes wind turbine operating data corresponding to the transmitted command.

The remote device may determine that fulfilling a user's request requires the transmission of multiple commands to the controller. For example, a user may request multiple types of wind turbine operating data, each type necessitating a command. Exemplary method 300, therefore, also includes, in one embodiment, composing 325 an additional command corresponding to the submitted request and transmitting 330 the additional composed command to the controller. The method also includes receiving 335 by the remote device an additional response from the controller. The additional response includes wind turbine operating data corresponding to the transmitted additional command. In certain embodiments, method 300 further includes storing the wind turbine operating data included in the received response on a recordable storage medium.

If a user is prompted 307 for a type or types of wind turbine operating data to retrieve, the user may select multiple types. A command is composed 310 and transmitted 315 for the first selected type of wind turbine operating data. An additional command may be composed 325 and transmitted 330 for each remaining selected type of wind turbine operating data. In an alternative embodiment, the user is simply prompted to submit a request for wind turbine operating data. In response to the submitted request, method 300 includes retrieving multiple types of wind turbine operating data by composing 310 and transmitting 315 a first command and composing 325 and transmitting 330 one or more additional commands.

In one embodiment, the wind turbine operating data includes a recorded sensor signal corresponding to a signal transmitted by a sensor communicatively coupled to the controller. In certain embodiments, the wind turbine operating data includes a recorded fault condition corresponding to a signal transmitted by a sensor communicatively coupled to the controller. In certain embodiments, the wind turbine operating data includes a recorded controller state, which includes a collection of controller configuration parameters.

The embodiments described herein provide critical data to an operator of a wind turbine without the delay or risk of input error associated with manually composing and transmitting commands to a controller. As a result, an operator of a malfunctioning wind turbine may efficiently and reliably retrieve wind turbine operating data required by a support specialist. The wind turbine may therefore be restored to a normal state in a timely manner.

Exemplary embodiments of a system and method for validating operation of a wind turbine are described above in detail. The system and method are not limited to the specific embodiments described herein, but rather each component may be utilized independently and separately from other components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for validating an operation of a wind turbine, the system comprising:
    a controller operatively coupled to the wind turbine, the controller comprising a first communication interface; and,
    a remote device comprising:
        an output device configured to prompt a user to select a plurality of types of wind turbine operating data to request from the wind turbine and to select at least one criterion identifying a subset of the wind turbine operating data to request from the wind turbine;
        a user input device configured to enable the user to select multiple types of the plurality of types of wind turbine operating data to request from the wind turbine and to select the at least one criterion, and to submit a request including the multiple types of wind turbine operating data selected by the user and the subset of the selected type of wind turbine operating data identified by the at least one criterion, the wind turbine operating data comprising at least one of a recorded sensor signal, a recorded fault condition, and a recorded controller state;
        a first processor operatively coupled to the user input device and programmed to compose a plurality of commands corresponding to the submitted request; and,
        a second communication interface operatively coupled to the first processor and communicatively coupled to the first communication interface, the second communication interface configured to sequentially transmit the composed commands to the first communication interface and sequentially receive responses from the first communication interface, each response comprising the wind turbine operating data corresponding to one of the transmitted commands, wherein the second communication interface is programmed to receive a respective response from the first communication device based on the transmitted command before transmitting a next one of the composed commands.

2. A system in accordance with claim 1, further comprising a sensor coupled to the wind turbine and configured to transmit a signal, and the controller further comprises a sensor interface communicatively coupled to the sensor.

3. A system in accordance with claim 2, wherein the controller further comprises a memory and a second processor programmed to:
    receive the signal transmitted by the sensor through the sensor interface;
    detect a fault condition based on the received signal; and,
    detect a controller state, wherein the received signal, the detected fault condition, and the detected controller state are stored in the memory.

4. A system in accordance with claim 2, wherein the sensor comprises at least one of an ambient air temperature sensor, a wind speed sensor, a wind direction sensor, an air density sensor, an atmospheric pressure sensor, a humidity sensor, a blade pitch sensor, a gear ratio sensor, a turbine speed sensor, a turbine temperature sensor, a voltage sensor, and a current sensor.

5. A system in accordance with claim 1, wherein the controller is configured to:
    receive the transmitted command through the first communication interface; and
    respond to the received command through the first communication interface.

6. A system in accordance with claim 1, wherein the remote device further comprises a recordable storage medium, and the first processor is further programmed to store the wind turbine operating data on the recordable storage medium.

7. A remote device configured to communicate with a controller operatively coupled to a wind turbine, said remote device comprising:
    a communication interface communicatively couplable to the controller;
    an output device configured to prompt a user to select a plurality of types of wind turbine operating data to request from the wind turbine and to select at least one criterion identifying a subset of the wind turbine operating data to request from the wind turbine;

a user input device configured to allow the user to select multiple types of the plurality of types of wind turbine operating data to request from the wind turbine and to select the at least one criterion, and to submit a request including the multiple types of wind turbine operating data selected by the user and the subset of the selected type of wind turbine operating data identified by the at least one criterion from the controller, the operating data comprising at least one of a recorded sensor signal, a recorded fault condition, and a recorded controller state; and, a processor operatively coupled to the communication interface and the user input device, the processor configured to:

recognize the request submitted through the user input device;

compose a plurality of commands corresponding to the multiple data types included in the recognized request;

sequentially transmit the composed commands to the controller using the communication interface; and, sequentially receive responses from the controller, each response comprising the wind turbine operating data corresponding to one of the transmitted commands, receive a respective response from the controller based on the transmitted command before transmitting a next one of the composed commands.

8. A remote device in accordance with claim 7, wherein the wind turbine operating data includes a recorded sensor signal corresponding to a signal transmitted by a sensor communicatively coupled to the controller.

9. A remote device in accordance with claim 7, wherein the wind turbine operating data includes a recorded fault condition corresponding to a signal transmitted by a sensor communicatively coupled to the controller.

10. A remote device in accordance with claim 7, wherein the wind turbine operating data includes a recorded controller state comprising a collection of controller configuration parameters.

11. A remote device in accordance with claim 7, wherein the processor is further configured to store the wind turbine operating data of the received response on a recordable storage medium.

12. A remote device in accordance with claim 7, wherein the processor is further configured to detect a version of software installed on the controller, and wherein the processor composes a command based on the detected version of software.

13. A method for validating an operation of a wind turbine from a remote device in communication with a controller, wherein the controller is operatively coupled to the wind turbine, the method comprising:

prompting a user to select a plurality of types of wind turbine operating data to request from the wind turbine and to select at least one criterion identifying a subset of the wind turbine operating data to request from the wind turbine;

enabling the user through the remote device to select the multiple types of the plurality of types of wind turbine operating data to request from the wind turbine and to select the at least one criterion, and to submit to the controller a request including the selected multiple types of the wind turbine operating data and for the subset of the selected type of wind turbine operating data identified by the at least one criterion, the operating data comprising at least one of a recorded sensor signal, a recorded fault condition, and a recorded controller state;

composing a plurality of commands corresponding to the submitted request;

sequentially transmitting the composed commands to the controller; and, sequentially receiving by the remote device a plurality of responses from the controller, each response comprising the wind turbine operating data corresponding to one of the transmitted commands, wherein the remote device receives a respective response from the controller before a next one of the composed commands is transmitted to the controller.

14. A method in accordance with claim 13, wherein the wind turbine operating data includes a recorded sensor signal corresponding to a signal transmitted by a sensor communicatively coupled to the controller.

15. A method in accordance with claim 13, wherein the wind turbine operating data includes a recorded fault condition corresponding to a signal transmitted by a sensor communicatively coupled to the controller.

16. A method in accordance with claim 13, wherein the wind turbine operating data includes a recorded controller state comprising a collection of controller configuration parameters.

17. A method in accordance with claim 13, further comprising storing the wind turbine operating data of the received response on a recordable storage medium.

* * * * *